United States Patent

[11] 3,564,161

[72] Inventor Hidenori Takishima
Sagamihara Japan
[21] Appl. No. 782,806
[22] Filed Dec. 11, 1968
[45] Patented Feb. 16, 1971
[73] Assignee Victor Company of Japan Limited
Yokahama, Japan
[32] Priority Dec. 14, 1967
[33] Japan
[31] 42/79763

[54] CUE SIGNAL RECORDING AND REPRODUCING SYSTEM FOR MAGNETIC RECORDING AND REPRODUCING APPARATUS
6 Claims, 22 Drawing Figs.

[52] U.S. Cl. 179/100.2, 178/6.6, 340/174.1
[51] Int. Cl. H04n 5/78; G11b 15/20
[50] Field of Search 179/100.2 (S), 6.6 (A); 340/174.1 (A), 174.1 (H)

[56] References Cited

UNITED STATES PATENTS

| | | | |
|---|---|---|---|
| 2,396,409 | 3/1946 | Berzer | 179/100.2 |
| 3,339,192 | 8/1967 | Zeller, Jr. | 179/100.2 |
| 3,180,930 | 4/1965 | Bounsall | 179/6.6 |

*Primary Examiner*—J. Russell Goudeau
*Attorney*—Louis Bernat

ABSTRACT: This is a cue signal system for a video magnetic recording and reproducing apparatus. The cue signals are in the form of digital codes or pulses synchronized with control signal pulses used for servo control. These pulses are coded to indicate the contents of the cue signals. The cue signals reproduced from the tape are compared with control signal pulses to detect the accurate contents of the reproduced cue signals irrespective of the rate of travel of the magnetic medium.

INVENTOR
HIDENORI TAKISHIMA

BY [signature]

ATTORNEY

INVENTOR
HIDENORI TAKISHIMA

BY Louis Bernat
ATTORNEY

INVENTOR
HIDENORI TAKISHIMA

BY Louis Bernat

ATTORNEY

PATENTED FEB 16 1971 3,564,161

SHEET 04 OF 12

INVENTOR
HIDENORI TAKISHIMA

BY Louis Bernat

ATTORNEY

INVENTOR
HIDENORI TAKISHIMA

BY [signature]

ATTORNEY

INVENTOR
HIDENORI TAKISHIMA

BY Louis Bernat

ATTORNEY

PATENTED FEB 16 1971 3,564,161

SHEET 07 OF 12

INVENTOR
HIDENORI TAKISHIMA

BY Louis Bernat

ATTORNEY

INVENTOR
HIDENORI TAKISHIMA

BY Louis Bernat

ATTORNEY

INVENTOR
HIDENORI TAKISHIMA

BY Louis Bernat
ATTORNEY

INVENTOR
HIDENORI TAKISHIMA

BY Louis Bernat
ATTORNEY

INVENTOR
HIDENORI TAKISHIMA

BY

ATTORNEY

INVENTOR
HIDENORI TAKISHIMA
BY Louis Bernat
ATTORNEY

CUE SIGNAL RECORDING AND REPRODUCING SYSTEM FOR MAGNETIC RECORDING AND REPRODUCING APPARATUS

The present invention relates in general to cue signal recording and reproducing systems for a video tape recorder or other magnetic recording and reproducing apparatus, and in particular to a system for recording and reproducing cue signals.

Picture signals recorded on a magnetic tape are classified according to their program content. Very often, it is necessary to pick out a desired type of program while the tape recorder is in fast winding or rewinding. Thus, it is necessary to record cue signals for designating the program signals and reproduce the same.

There have hitherto been several methods for indicating and recording cue signals identifying the contents of the program. These methods include (1) composing sets of pulses with each set having different number of pulses, (2) relying on differences in amplitude between pulses for indication of cue signal contents, (3) relying on variations in the width of pulses for indication of cue signal contents, (4) relying on frequencies for indication of cue signal contents in which pulses are frequency modulated by various frequencies depending on the kinds of pulses, (5) relying on the phase relation of pulses for indication of cue signal contents, (6) using two tracks for recording cue signals, and (7) recording cue signals and picture signals on picture signal tracks.

However, the aforementioned prior art methods are not without disadvantages. When method (1) is used, it is impossible to increase the kind of cue signals that can be recorded within a given time interval. The methods (2) to (5) make it impossible to accurately detect cue signal contents when there are variations in the rate of travel of the tape. The method (6) cannot be incorporated in existing video tape recorders that have been widely used. Very complicated circuits, with a multiplicity of building blocks, must be used for detecting cue signals with the method (7).

The present invention overcomes all the aforementioned disadvantages of these prior art methods. Generally, when there are variations in the rate of tape travel, the intervals of time between the pulses of a set of digital pulses are in inverse proportion to the tape speed, and they do not remain constant. Thus, it is very difficult to accurately detect the presence or absence of pulses in predetermined pulse positions in the digital signals by the simple expedient of relying on a combination of the presence and absence of pulses. To obviate this problem, it becomes necessary to detect the rate of travel of the tape.

In the system embodying this invention, the code is accurately read by utilizing control signal pulses which are recorded on the tape for causing the tape to travel, or the picture reproducing head to rotate, at the same rate in playback as in recording.

Accordingly, a primary object of the present invention is to provide a cue signal recording and reproducing system for video signal magnetic recording and reproducing apparatus. This permits accurate reproducing and detecting cue signal contents despite variations in the rate of tape travel during playback, winding, or rewinding.

Another object of the invention is to provide a system for recording and reproducing cue signals. More particularly, the cue signals are recorded on one track on a tape without using an additional track for detecting the speed and phase of cue signals. Accurate cue signals can be provided during playback by comparing the signals with control signal pulses derived from a control signal track used essentially for other control purposes.

Another object of the invention is to provide a cue signal recording and reproducing system in which each cue signal is made up of coded digital signals indicating cue contents by the presence or absence of pulses and the number thereof. Thus, a large variety of cue signals can be recorded on and reproduced from one track on a tape per unit time.

Still another object of the invention is to provide a cue signal recording and reproducing system which permits accurate detection of the start and finish of the production of cue signals without being affected by noise or other factors. This system functions irrespective of the direction of travel of the tape.

A further object of the invention is to provide a system for recording and reproducing cue signals which is adapted for use in automatic operation of a video tape recorder.

Additional objects and advantages of the invention will become apparent from a consideration of the description set forth hereunder, when taken in conjunction with the accompanying drawings, in which.

Figure 1:
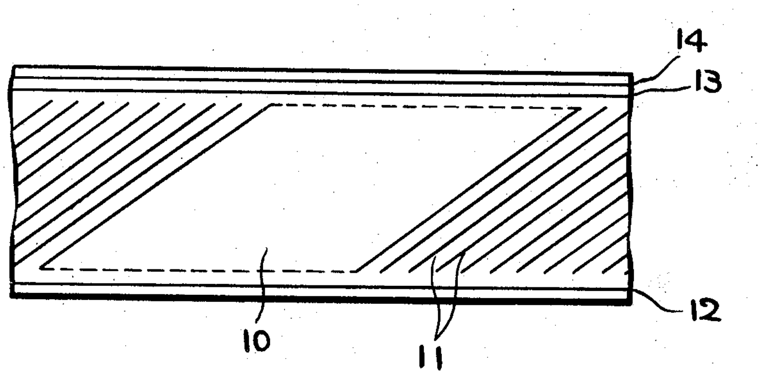
FIG. 1 is a view showing the track pattern of a magnetic tape used in the system embodying this invention.

FIG. 1 shows the track pattern of a tape for video tape recorders of the 2-head helical scan system. Oblique picture signal tracks 11 are formed on a tape 10, and an audio signal track 12 is formed in the lower marginal portion of the tape longitudinally thereof. A control signal track 13 and a cue signal track 14 are formed in the upper marginal portion of the tape, also longitudinally thereof.

Figure 2:
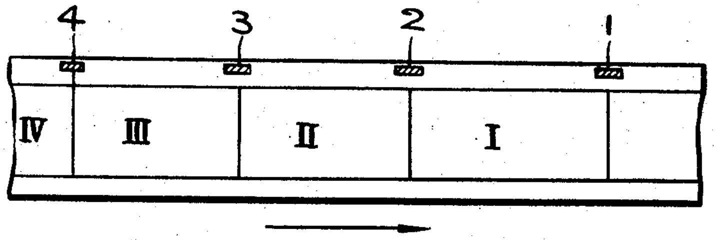
FIG. 2 is a schematic representation of the relative positions of cue signals and program picture signals on a magnetic tape.

FIG. 2 shows the relative positions of the picture signals and cue signals on the tape 10. Cue signals 1,2,3 are recorded in the form of binary digital signals. These signals are in positions on the tape corresponding to the start of program picture signals I, II, III respectively. The arrow indicates the direction of tape travel.

Figure 3:
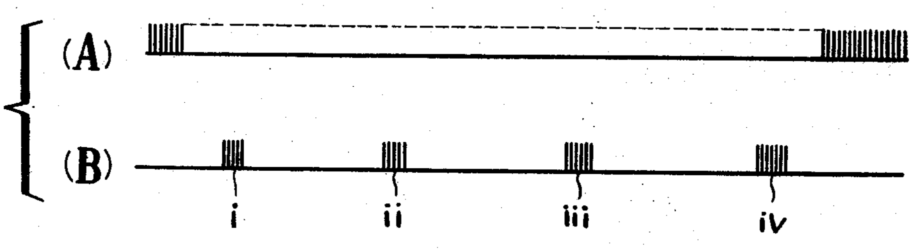
FIGS. 3A and 3B are schematic representations of control signals and cue signals respectively.
Figure 4:
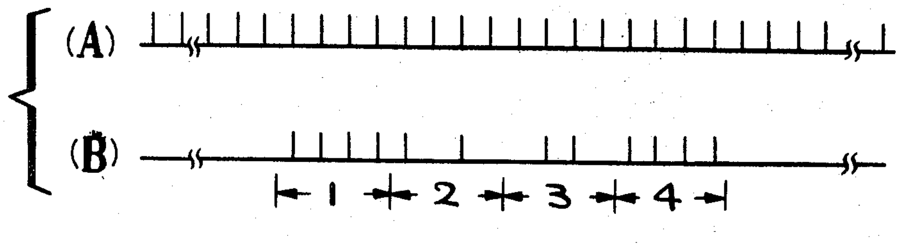
FIGS. 4A and 4B are fragmentary enlarged views of each of the signals shown in FIGS. 3A and 3B.

FIG. 3A shows the wave form of the control signal pulses which are continuously recorded at regular intervals during the time of recording picture signals. FIG. 3B shows the wave form and tape positions of cue signals which correspond to the cue signals 1 to 1 in FIG. 2. The pulses of FIGS. 3A and 3B are shown on an enlarged scale in FIGS. 4A and 4b—which are the control signals and cue signals, respectively. Each of the cue signals is composed of 16 bit binary digital signals arranged in 4 columns. The 4 bits in 1 column form the unit of signal pulses making up a cue signal. The columns 1 and 4 are used as signals for indicating the "start" and "finish" of the cue signal respectively. The four bits thereof consist of signals showing 1. The columns 2 and 3 are both used as signals for indicating the contents of a program. The presence and absence of pulses and the arrangement thereof are combined by using four bits to indicate decimal numbers 0 to 9. The column 2 is used as the column for tens and the column 3 is used as the column for ones so that the digits of the columns 2 and 3 taken together indicate the number of two columns.

The cue signal is synchronous with the control signal because the cue is formed by the control signals, as subsequently to be described. In recording or normal playback, the control signal pulses are arranged at predetermined regular intervals because the tape moves at a predetermined rate of travel. However, during fast winding or rewinding, the intervals between the pulses of the reproduced control and cue signals are shortened in inverse proportion to the rate of tape travel speed. This is because the pulses come faster when the tape travels at a higher rate during fast winding than the predetermined normal recording rate of travel.

Figure 5:
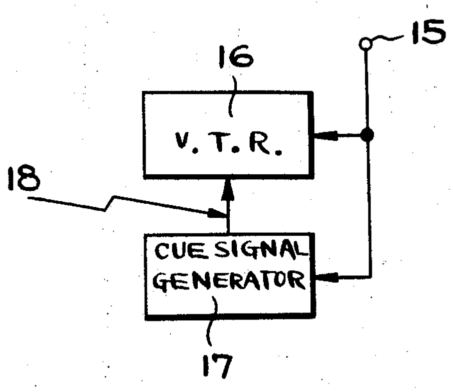
FIGS. 5 and 6 are schematic block diagrams of two respective embodiments of a recording section of the system embodying this invention.

One embodiment of a recording section of the system according to this invention is shown in FIG. 5 by a schematic block diagram. The control signal pulses are supplied through an input terminal 15 to a video tape recorder 16 to be recorded as the track 13 of the tape 10 and to a cue signal generator 17. Cue signals formed in generator 17 are supplied through a path 18 to the video tape recorder 16 where they are recorded on the track 14 of the tape 10 simultaneously with the recording of picture signals.

Figure 6:
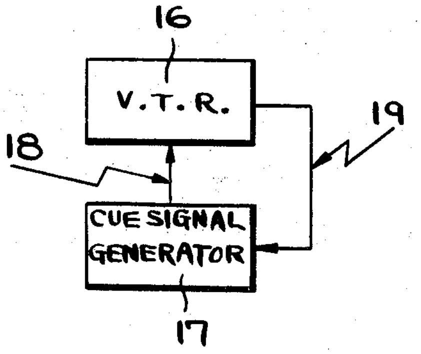

Another embodiment of the cue signal recording section is shown in FIG. 6. In this embodiment, the control signals are reproduced simultaneously as the video tape recorder plays back the picture signals. These control signals are supplied over a path 19 to the cue signal generator 17. Responsive thereto, the cue signals are recorded on the track 14 of the tape 10 in the video tape recorder 16.

Figure 7:
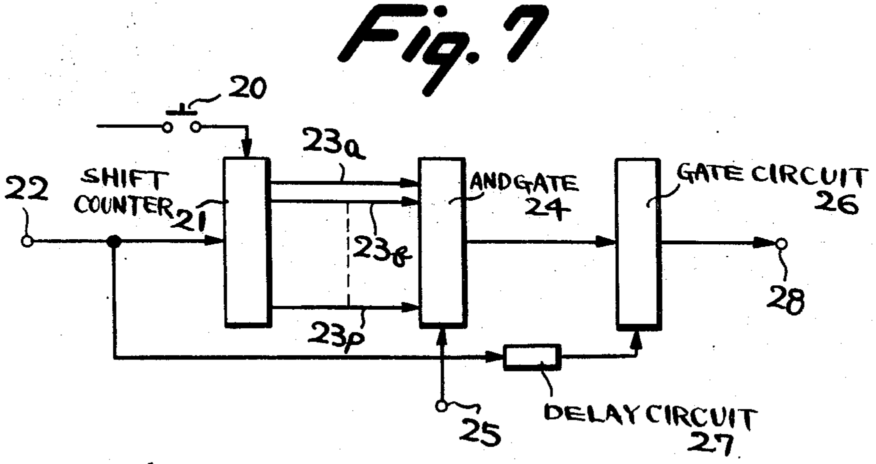
FIG. 7 is a schematic block diagram of one embodiment of a cue signal generator of the recording section.
Figure 8:
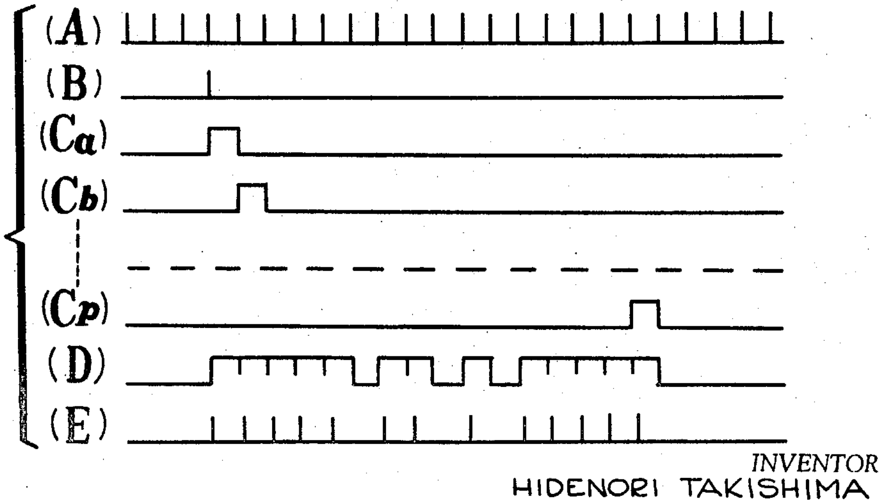
FIGS. 8A to 8E are wave forms of signals in various portions of the diagram of FIG. 7.

One embodiment of the cue signal generator 17 is shown in FIG. 7 by a block diagram. When a recording start switch 20 is closed, a trigger pulse may be applied to a shift counter 21, as shown in FIG. 8B. The shift counter 21 includes 16 shift counter circuits for receiving control signal pulses from a terminal 21. These shift pulses generate 16 output signals of the wave forms $C_a$ to $C_p$ of FIG. 8 which are supplied, as gate pulses, to an AND gate 24 over paths $23_a$ to $23_p$. The AND gate 24 is composed of 16 AND gate circuits which receive preset pulses through a terminal 25 simultaneously with the gate pulses supplied over the paths $23_a$ to $23_p$. These preset switch pulses are in the form of a number of two figures. They are applied to predetermined AND gate circuits in the AND gate 24 (after the number in decimal notation is converted into a number represented in binary notation) so as to open or to close the gate circuits. The circuits, to which the paths $23_a$ to $23_d$ and $23_m$ to $23_p$ are connected, are open at all times.

The AND gate outputs of the AND gate 24 are arranged into a systematized set by OR circuits (not shown). A signal of the wave form shown in FIG. 8D is taken out from AND gates 24 to be supplied to a wave form shaping circuit 26 depending on the state of the opening and closing of the AND gate circuits. The signal supplied from the AND gate 24 to the gate circuit 26 is combined with a control signal which appears at the terminal 22 and is applied through a delay circuit 27 to the gate circuit 26. This combination provides a cue signal shown in FIG. 8D which is taken out through a terminal 28.

Figure 9:
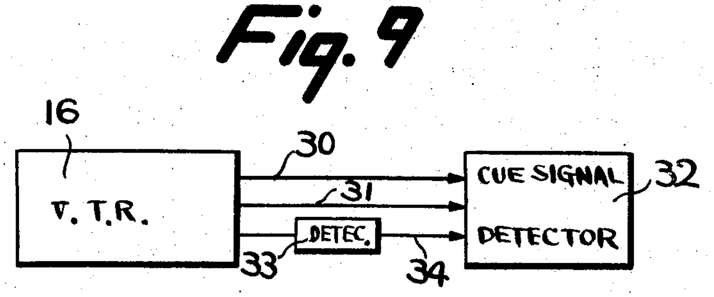
FIG. 9 is a schematic block diagram of one embodiment of a reproduction section of the system embodying this invention.

One embodiment of a system for reproducing a recorded cue signal is shown in FIG. 9, in a schematic diagram. The cue signal and control signal reproduced from the video tape recorder 16 are supplied to a cue signal detector 32 through paths 30 and 31, respectively. At the same time, the output of a tape movement direction detector 33 is also supplied to the cue signal detector 32 through a path 34. Detection of the direction of the travel is necessary because the tape moves in one direction during playback and in an opposite direction during rewinding. The cue signal indicates the contents of cue by the presence or absence of coded pulses. Thus, the coded arrangement is reproduced in the reverse order during rewinding, with a result that the pulses are read out in reverse order, and a memory circuit is operated mistakenly. This is why the aforementioned tape movement direction detector 33 is used in the present invention.

Figure 10:
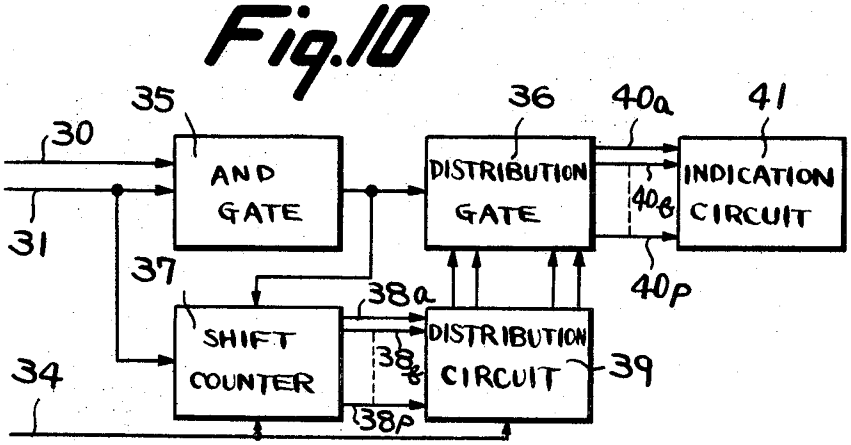
FIG. 10 is a schematic block diagram of one embodiment of a cue signal detector.

FIG. 10 is a block diagram of one embodiment of the cue signal detector 32. The cue signal and control signal are of the wave forms shown in FIGS. 11A and 11B, respectively. These signals are supplied to an AND gate 35 through the paths 30 and 31, respectively. They are AND gated therein for accurately detecting the presence or absence of pulses. Then, a gate output cue signal of the wave form shown in FIG. 11G is distributed to AND gate circuits in a signal distribution gate 36 and also supplied to a shift counter 37.

It should be noted here that the control signal is also AND gated in the AND gate 35. If only the cue signal is AND gated, it will be impossible to accurately detect that the pulses are indicating "O" when there is a variation in the rate of travel of the tape. The shift counter 37 is composed of shift counter circuits using a first pulse of the cue signal as a trigger pulse. The control signal pulses supplied through the path 31 are shift pulses. The shift counter 37 supplies sixteen outputs of the wave forms shown in FIG. 11, $C_a$ to $C_p$, to a gate signal distribution circuit 39 through paths $38_a$ to $38_p$.

Outputs of the shift counter circuits 37 are supplied through the distribution circuit 39 to the gate circuits in the signal distribution gate 36. The output of gate 36 is 16 outputs of the wave forms shown in FIG. 11, $D_a$ to $D_p$. These outputs are fed over paths $40_a$ to $40_p$ to a memory and indication circuit 41 where they operate 16 memory elements. The signals of the wave forms $C_a$ to $C_p$, shown in FIG. 11, are passed through the distribution circuit 39 to the AND gate circuits of the distribution gate 36 when the direction of the travel is the same as the direction of movement thereof in recording (or when the video tape recorder is in a playback or fast winding mode).

Figure 11:
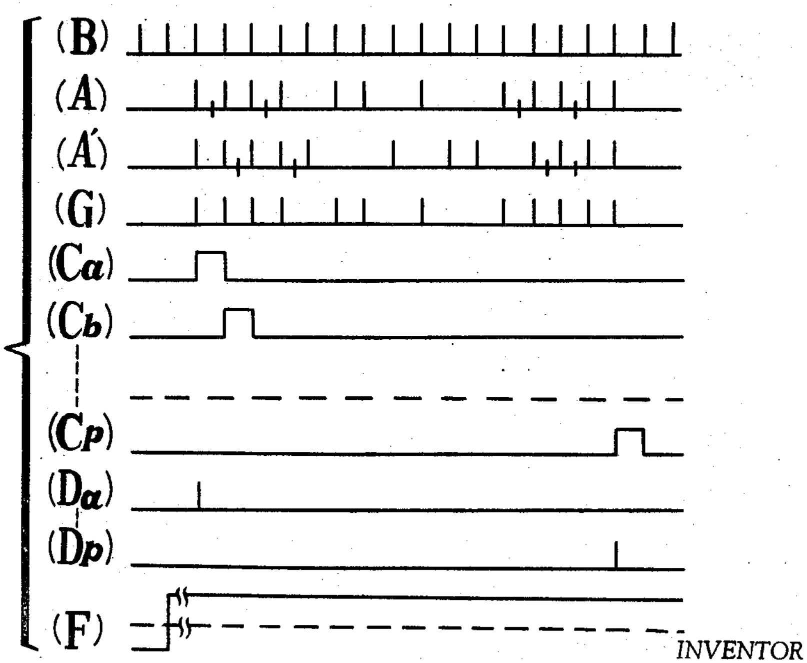
FIGS. 11A to 11G are wave forms of signals in various portions of FIG. 10.

When the tape is moving in the reverse direction (or when the video tape recorder is in a rewinding mode) the signal of the wave form $C_p$ of FIG. 11 appears first, as if it were the signal of the wave form $C_a$ thereof. Likewise, the signal of the wave form $C_o$ would appear instead of the signal of the wave form $c_b$. It should be noted that when the tape is moved in the reverse direction, the cue signal of the wave form A shown in FIG. 11 is read out in reverse so that its wave form will be converted to the wave form A' shown in FIG. 11. The memory elements in the memory and indication circuit 41 stores successively, as 1 or 0, the pulses of the signal detected by the distribution gate 36 and translates the binary-code signal into a decimal-coded signal.

In addition to the aforementioned circuits, an exclusive circuit is provided for detecting four bits as a unit. These signals are the first column and the fourth column of the signal shown in FIG. 4B. They are used as "start read out" and "finish read out" signals respectively. That is, the read out of the second and third columns is confined to a period between these two signals, so that malfunction due to noise or the like can be prevented. The memory elements in the memory and indication circuit 41 are reset by the "start read out" signal. Therefore, the program number represented by the cue signal is stored, and read out can be withheld until the next cue signal is read out.

The "finish read out" signal is used for automatic operation of the video tape recorder, as subsequently to be described.

Also, when a picture signal recorded by the video tape recorder is reproduced from the particular program number designated, cue signals are read out while the tape is wound quickly by fast winding or rewinding. Playback is begun once an agreement is found between the cue signal read out and the desired picture signal. Since a cue signal is composed of a series of pulses, connected in chronological sequence, it does not indicate a complete number until after the fourth bit in the third column is read out. This makes it necessary to compare a particular program number and a complete number read out after a cue signal has been found. The "finish read out" signal is also used as a check pulse at this time.

Further embodiments of the system according to this invention will be explained in detail with reference to FIG. 12 et seq.

Figure 12:
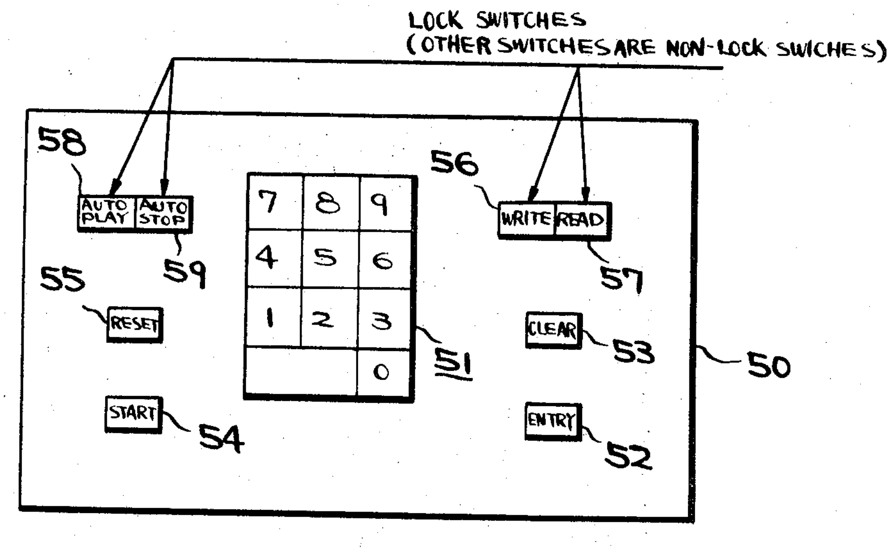
FIGS. 12 and 13 are plan views of an operation panel and an indication panel, respectively, of an apparatus embodying the system of this invention.
Figure 13:
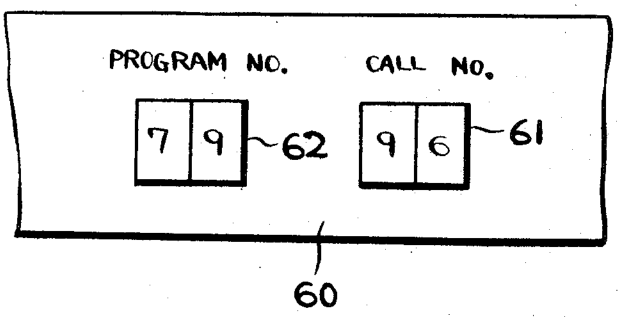

FIGS. 12 and 13 show an operation panel and an indication panel of an apparatus incorporating embodiments of this invention. An operation panel 50 is provided with push buttons 51 having ten nonlocking switches of 0 to 9. These may be the same type of switches that are conventionally provided in desk computers. The operation panel is also provided with nonlocking entry switch 52, clear switch 53, start switch 54, and reset switch 55. A write switch 56, read switch 57, automatic play switch 58 and automatic stop switch 59 may be locking switches. An indication panel 60 shown in FIG. 13 includes a call number indication zone 61 and a program number indication zone 62, each comprising two count indication tubes containing the 10 digits 0 to 9.

During operation, the indication panel 60 is examined to make sure that no digits other than 0 are indicated in the indication tubes. If the opposite is the case, the clear switch 53 is pushed.

Figure 14:
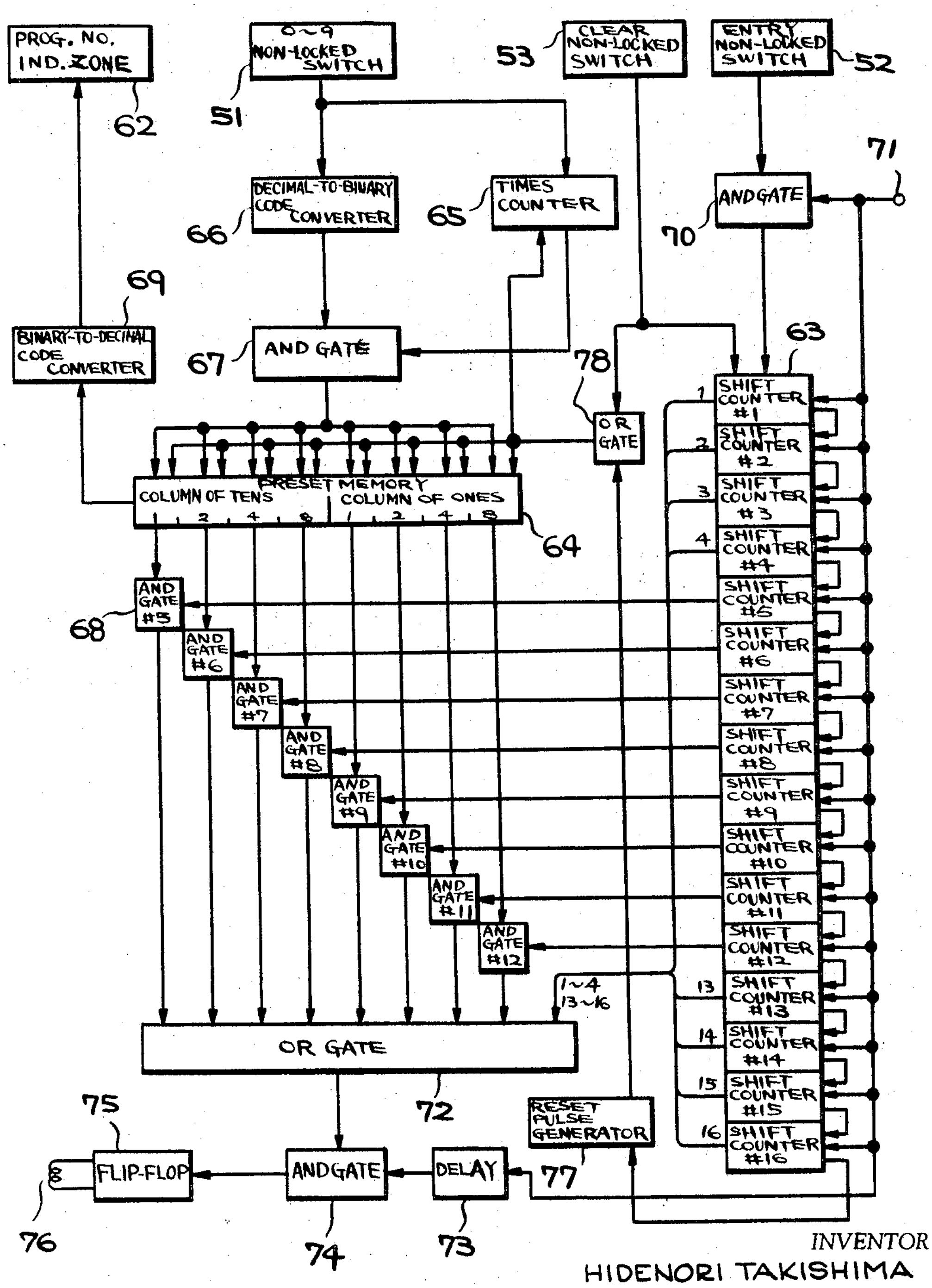
FIG. 14 is a block diagram showing in detail the embodiment of the recording section of the system according to this invention.

FIG. 14 shows, in detail, the embodiment of a recording section of the system. Pushing the clear switch 53 resets shift counter circuits 63–1 to 63–16, eight preset memory circuits 64, and a times counter 65. This clear switch ushers in an initial state. Then, buttons 51 are pushed to key in the digits corresponding to the number of a desired cue signal. If, for example, the desired number is 79, the button corresponding to the number to 7 is pushed to store 7 in the tens column, and then the button 9 is pushed to store 9 in the units column.

The switches of the push buttons 51 and a decimal-to-binary code conversion circuit 66 are connected with each other by ten lines. The decimal-to-binary code conversion circuit 66 and an AND gate 67 are connected with each other by four lines. The signal produced by the push button 51, designating 7, is broken down by the conversion circuit 66 into three signals of 1, 2, and 4, and then it is supplied to AND gate circuits 67. Each time that one of the buttons 51 is pushed, the times counter 65 advances to store a memory of the number of times the push buttons are pushed. The output of the counter 65 is supplied to the AND gate 67 where it is AND gated with the output of the conversion circuit 66. The three signals of 1, 2, and 4 excite the memory elements of 1, 2, and 4 in the column of tens of the preset memory circuit 64, so that the digits can be stored therein. The digit 9 is stored in the units column of ones responsive to the pushing of the button 9. At this time, the memory elements of 1 and 8 are excited in the column of ones.

Part of the outputs of preset memory circuits 64 is converted into a decimal-coded number by a binary-to-decimal code conversion circuit 69. Conversion is separate for the column of tens and the column of ones. Thus, the digits 7 and 9 can be displayed on the indication tubes of the program number indication zone 62. Thus, it will be appreciated that the indication tube for displaying the digit in the column of tens will be lighted to indicate the digit 7 if the button 7 is pushed first. The indication tube for displaying the digit of the column of ones will be lighted to indicate the digit 9 if the button 9 is pushed second.

In this way, a number is preset to be recorded as a cue signal on the tape by a video tape recorder. The preset number is not immediately recorded on the tape, however. Then, the entry switch 52 is pushed at the exact time when the cue signal is to be recorded on the tape by the video tape recorder.

Figure 15:
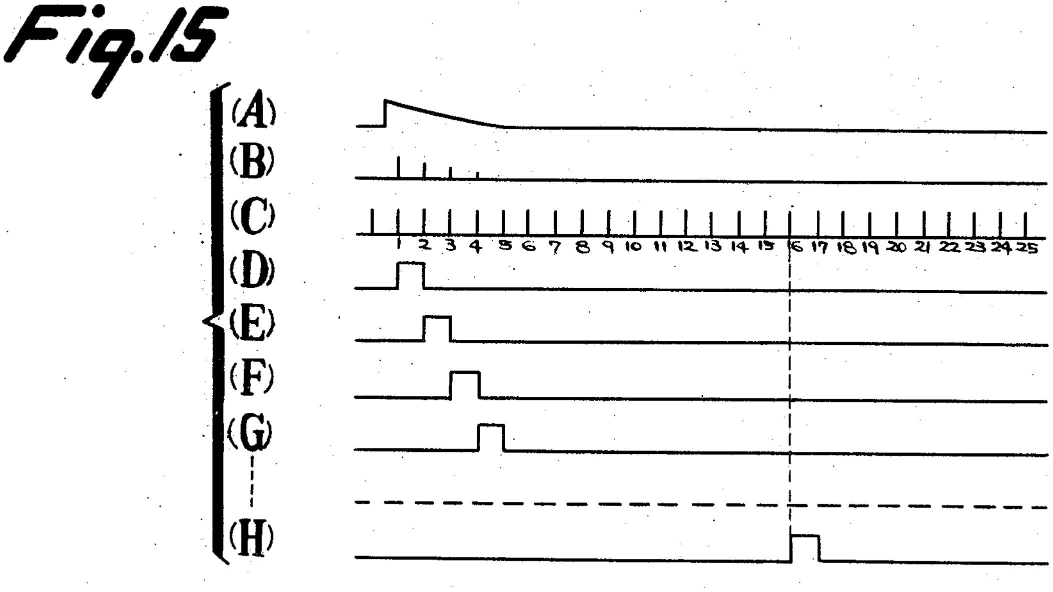
FIGS. 15A to 15H are wave forms of signals associated with a shift counter.

FIG. 15A shows the wave form of the output of the switch 52. The recording of the cue signals does not necessarily agree in timing with the control signal pulses. Thus, the cue signals are synchronized at a next AND gate 70 to come into agreement in timing with control signal pulses received at a terminal 71. The output of the wave form shown in FIG. 15B of the AND gate 70 drives the shift counter circuit 63–1. The shift counter circuits 63–1 to 63–16 are connected in series and driven by the control signal pulses of the wave form shown in FIG. 15C as they are supplied through said terminal 71. Thus, the shift counter circuits 63 operate successively from 63–1 to 63–16 at intervals corresponding to the pulse intervals of the control signal.

The outputs of shift counter circuits is 63–1 to 63–4 and 63–13 to 63–16 are supplied directly to an OR gate 72. The outputs of shift counter circuits 63–5 to 63–12 are supplied to the AND gate circuits 68–5 to 68–12, respectively.

FIGS. 16B to 16J show the wave forms of output voltages generated by the AND gate circuits 68–5 to 68–12 when the aforementioned number 79 was preset. FIG. 16A shows the wave form of the control signal pulses. The outputs of AND gate circuits 68–5 to 68–12 are gated at the OR gate 72 together with the outputs of shift counter circuits 63–1 to 63–4 and 63–13 to 63–16 to provide an OR gate output of the wave form shown in FIG. 16K. This output signal of the OR gate 72 is gated in the next AND gate 74 together with a delayed control signal of the wave form shown in FIG. 16L. The pulses of FIG. 16L are produced by passing the control signal supplied through the terminal 71 through a delay circuit 73.

Figure 16:
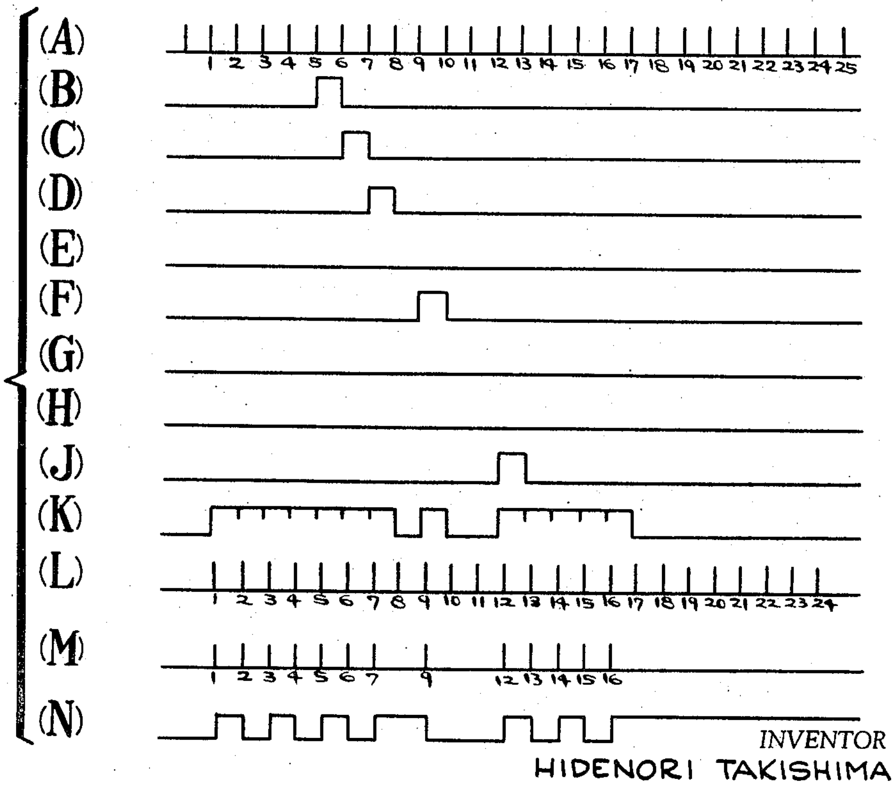
FIGS. 16A to 16N are wave forms of signals in various portions of the diagram of FIG. 14.

The output of the AND gate 74 is of the wave form shown in FIG. 16M. Each pulse of the wave form shown in FIG. 16M excites a flip-flop circuit 75 which provides a cue signal pulse of the wave form shown in FIG. 16N. These pulses are recorded on the tape by a cue signal recording and reproducing head 76. Though not shown in the block diagram of FIG. 14, a terminal of the recording and reproducing head 76 can be switched from a "recording" mode to a "read out" ("-playback") mode or vice versa. The head is connected to the output of the flip-flop circuit 75 in a "recording" mode and to the input of a preamplifier (not shown in FIG. 14) in a "read out" mode.

When cue signals are recorded by means of the head 76, no separate erase head is required. A current sufficient to saturate the magnetic tape is passed in either a positive or negative direction at all times. Consequently, signals already recorded on the tape, are erased by the recording currents. Only the variation in the amount of current of the signals to be recorded in recorded. Thus, if a voltage corresponding to the wave form shown in FIG. 16N is applied to the head 76, it will be reproduced during a "read out" operation in the form of pulses having an upwardly directed and downwardly directed portion.

Upon completion of the operation of shift counter circuit 63–16, its output is supplied to a reset pulse generator 77. The output of generator 77 is gated together with the signal from the clear switch 53 at an OR gate 78 where they are converted into reset pulses. The preset memory circuits 64 and the times counter 65 are restored to an initial state by the reset pulses. Accordingly, the digits indicated in the indication zone 62 disappear. Of the 16 pulses of a cue signal, the pulses 1 to 4 and 13 to 16 are used as signals for indicating the "start" and "-finish" of the cue signal. They are automatically generated whenever the entry switch 52 is pushed.

Figure 17:
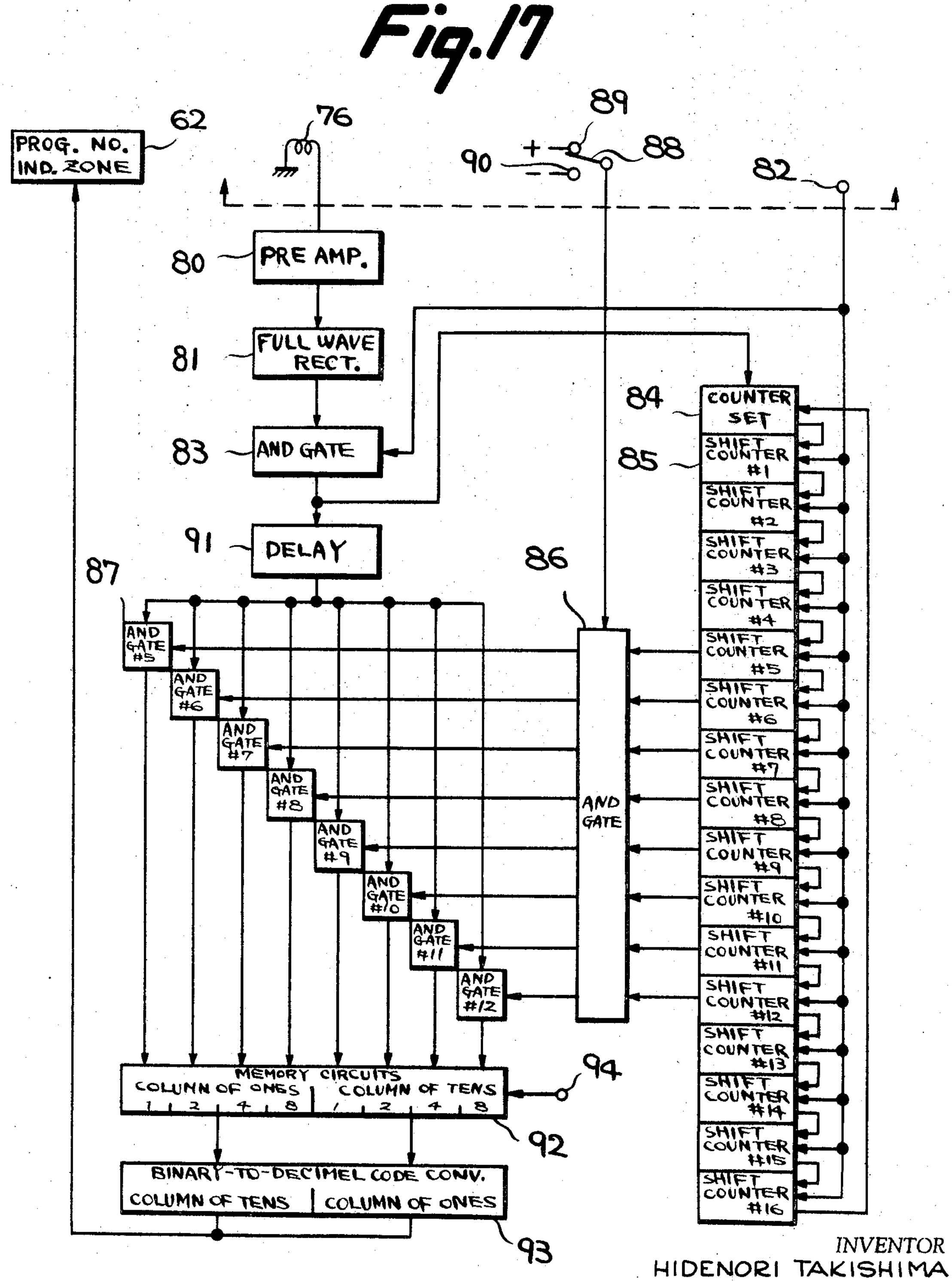
FIG. 17 is a block diagram showing in detail the embodiment of the reproduction section of the system according to this invention.

Now, operation of the system just described for reading out a cue signal from the tape of the video tape recorder will be explained with reference to FIG. 17.

Figure 18:
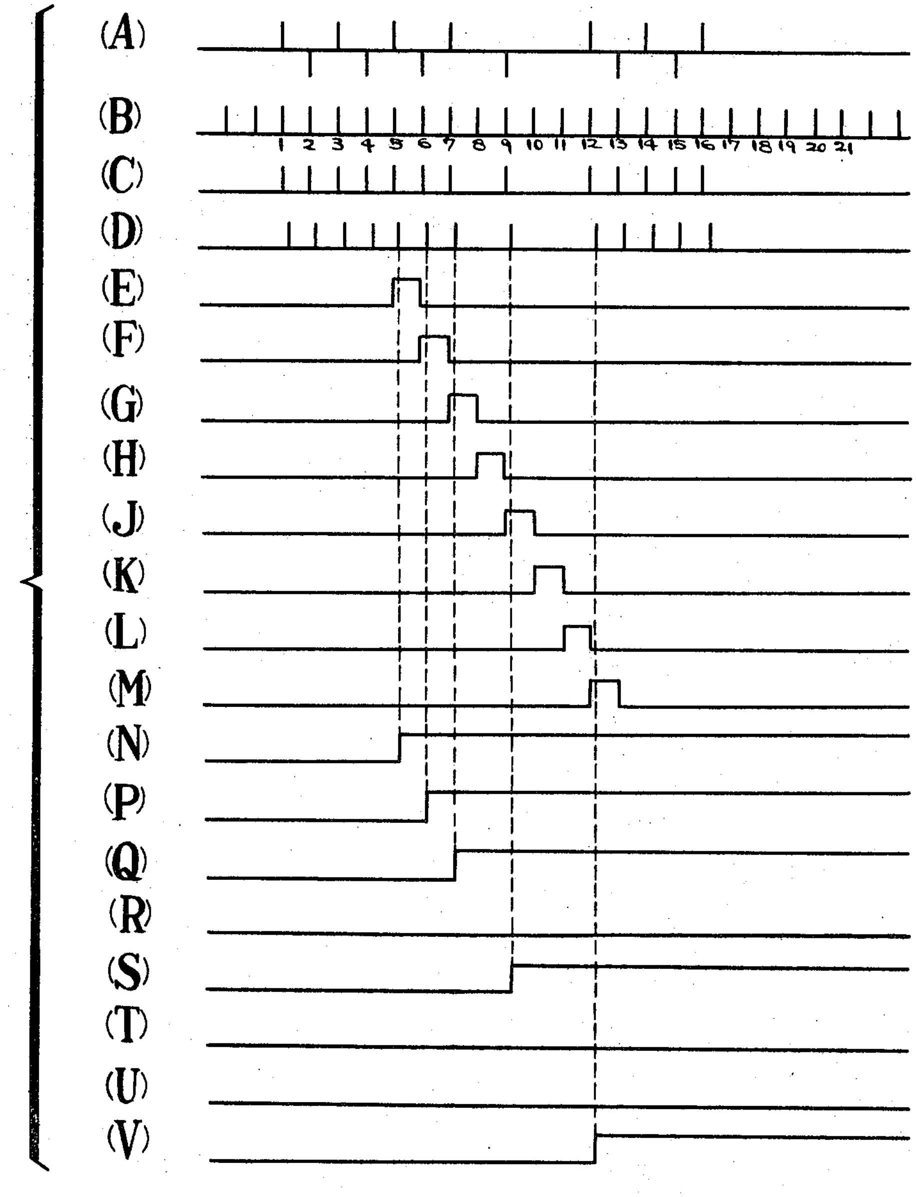
FIGS. 18A to 18V are wave forms of signals in various portions of the diagram of FIG. 17 when the direction of tape travel is the same in both playback and recording.

A cue signal reproduced by the cue signal recording and reproducing head 76 is amplified at a preamplifier 80 and shaped into a differential wave form, as shown in FIG. 18A. The output of the amplifier 80 is rectified at a full-wave rectifier 81 and converted into pulses in only the positive direction as shown in FIG. 18C. These pulses are then gated in an AND gate 83 together with reproduced control signal pulses (FIG. 18B) supplied through a terminal 82. The gating is provided for reducing noises that may be introduced between pulses. A part of the output of the AND gate 83 actuates a counter set circuit 84. The output of the counter set circuit 84 simultaneously operates shift counter circuits 85.

The shift counter circuits 85 operate in the same manner as the shift counter circuits 63 in the recording section of the system. The outputs of shift counter circuits 85–5 to 85–12 are supplied to AND gate circuits 87–5 to 87–12 through an AND gate 86. At this time, if the direction of tape movement is the same as the direction of tape movement during recording, the AND gate 86 lets the outputs of the shift counter circuits 85 pass therethrough. A switch 88, mechanically coupled to the video tape recorder, is in contact with a contact 89. The output of AND gate 83, FIG. 18D, is slightly delayed by a delay circuit 91. The outputs of the AND gate 86 are thus gated with a slight delay at AND gate circuits 87–5 to 87–12.

Thus, the cue signal is developed into pulses as shown in FIGS. 18E to 18M to excite the respective memory circuits 92. That is, if the cue signal has a number 79, the memory circuits 1, 2, and 4 in the "column of tens" and 1 and 8 in the "column of ones" are excited by the cue signal pulses of the AND gate circuits 87–5, 87–6, 87–7, 87–9 and 87–12, and memory 92 stores the same. The wave forms of voltages used for this purpose are shown in FIG. 18N—18V. Thus, the memory circuits 92 start operation in keeping with the incoming cue signal pulses.

The outputs of memory circuits 92 are introduced into binary-to-decimal code conversion circuits 93, and the outputs of circuits 93 light the number indication tubes 62 of two columns. The number 94 identifies a reset pulse input terminal. The counter set circuit 84 is reset upon completion of the operation of the shift counter circuit 85–16. The memory circuits remain in the described conditions until the next cue signal is applied thereto and reset by the "start" signal of the next cue signal.

Figure 19:
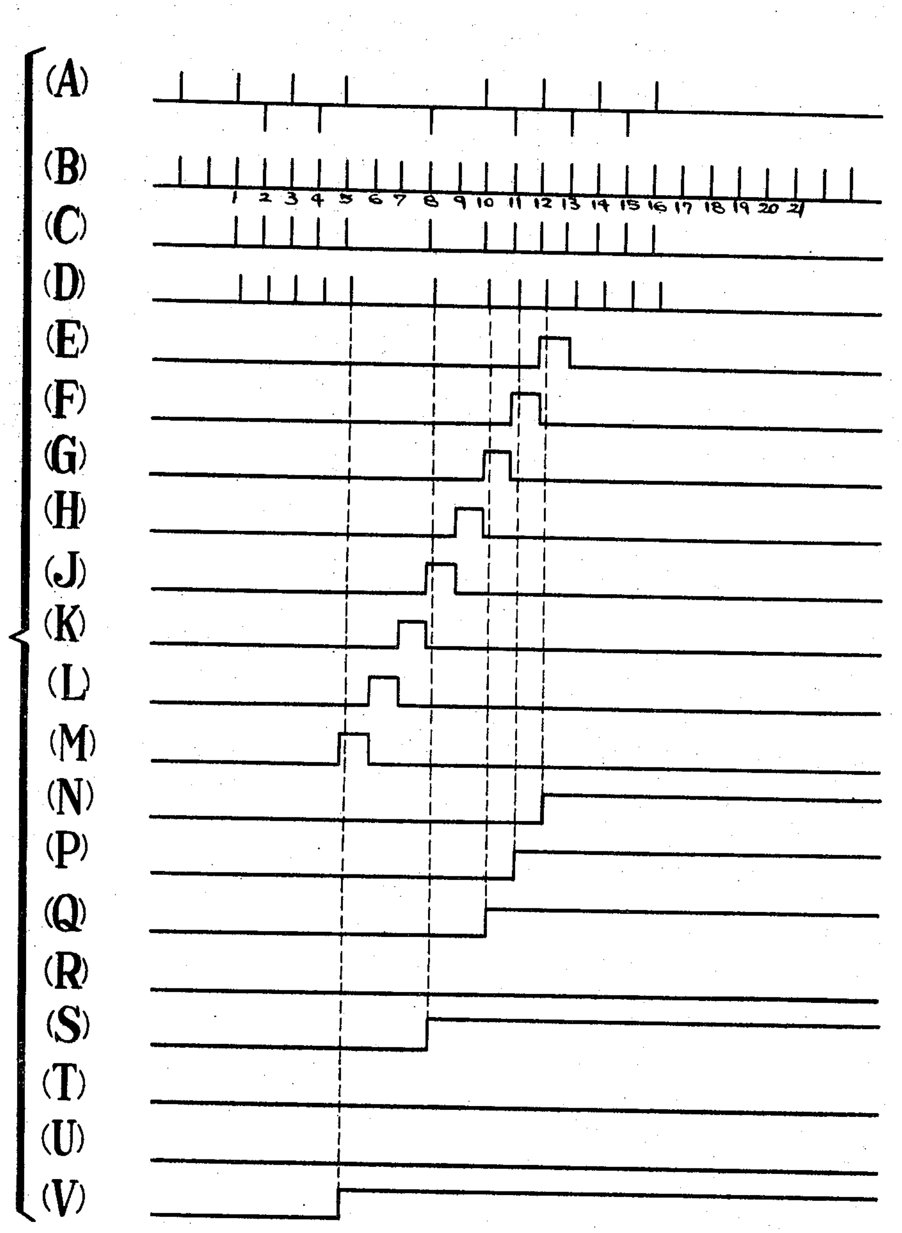
FIGS. 19A to 19V are wave forms of signals in various portions of the diagram of FIG. 17 when the direction of tape travel in playback is opposite to the direction of tape travel in recording.

If the direction of the tape movement is opposite to the direction of movement during recording (or if the tape is being rewound), the output of the preamplifier 80 is as shown in FIG. 19A as contrasted to that shown in FIG. 18A, Note that the cue signal is reversed, i.e., the negative pulses in FIG. 18A are 3, 1, 2 and in FIG. 19A, they are 2, 1, 3. Thus, the pulses are reversed in chronological sequence. At this time, the switch 88 is in contact with a contact 90. When the AND gate 86 distributes the outputs of shift counter circuits 85 to the AND gate circuits 87, the order of pulse distribution is in reverse, as compared with order of pulse distribution when the tape is moving in the normal direction, as described above. The outputs of shift counter circuits 85–5 to 85–12 are supplied to the AND gate circuits 87–12 to 87–5. The operation thereafter is identical with the operation of the embodiment described above.

The FIG. 19B shows the wave form of control signal. FIGS. 19C and 19D show the wave forms of the output of full-wave rectifier 81 and the delayed output thereof at 91. FIGS. 19E to 19M show the wave forms of the input signals of AND gate circuits 87–5 to 87–12. FIGS. 19N to 19V show the wave forms of the voltages of memory circuits 92.

Figure 20:
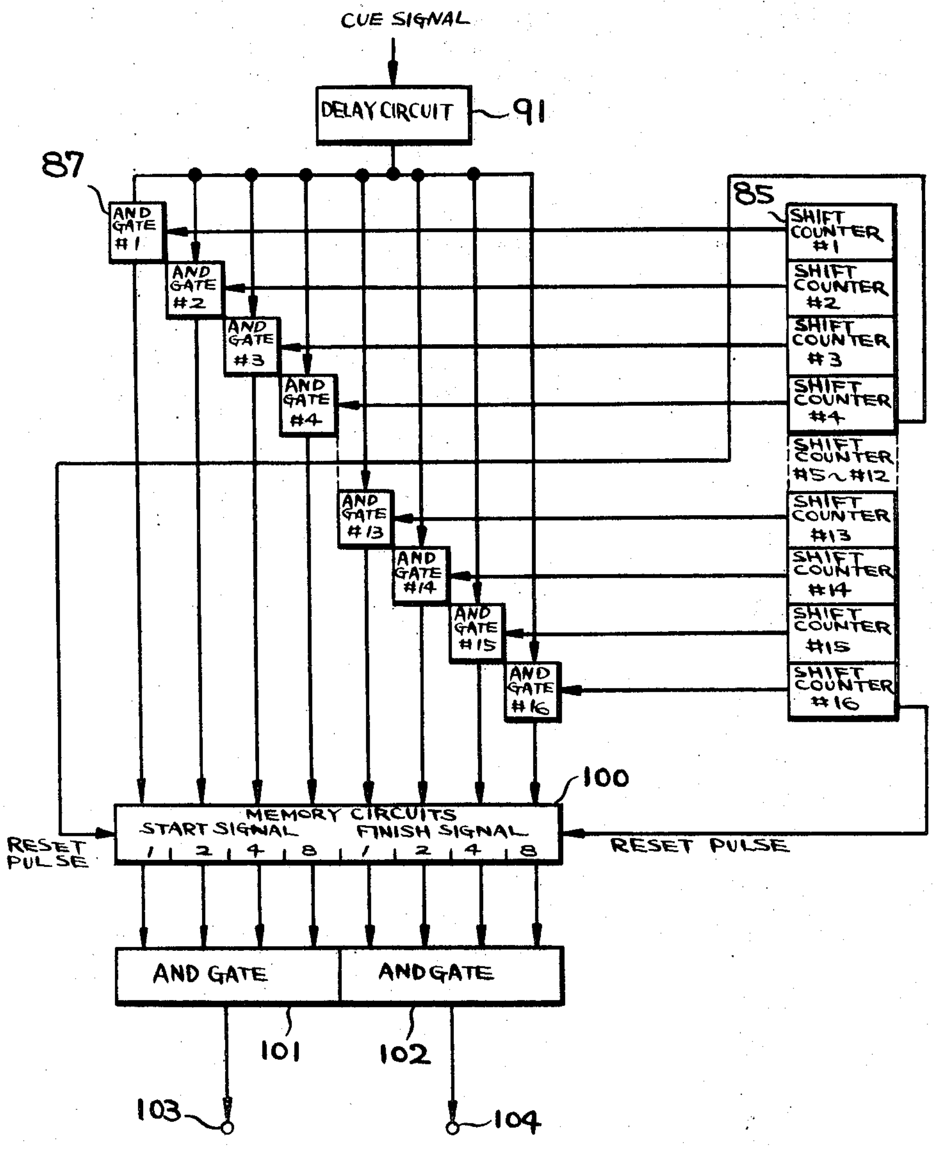
FIG. 20 is a block diagram showing in detail a circuit for detecting the start and finish of a cue signal.
Figure 21:
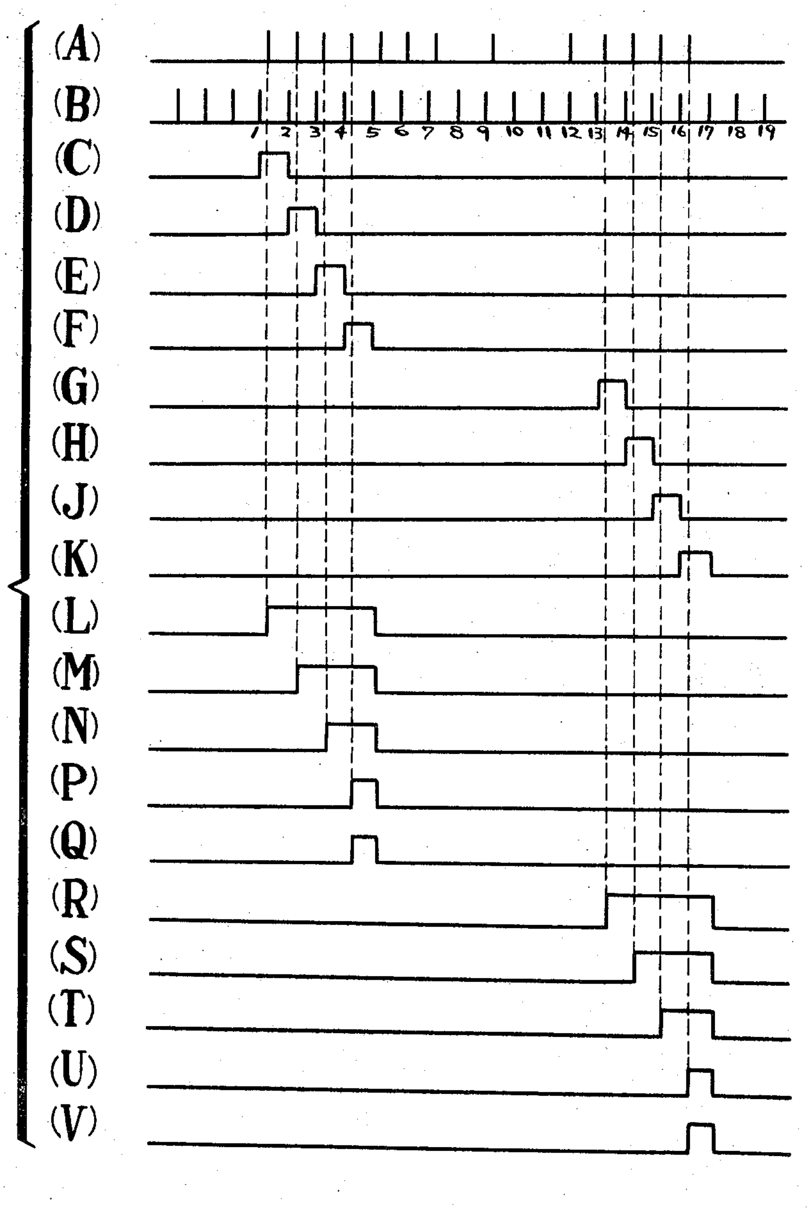
FIGS. 21A to 21V are wave forms of signal voltages in various portions of FIG. 20.

An embodiment of a circuit for detecting the start and finish of a cue signal will now be explained with reference to FIG. 20. In this figure, the delay circuit 91 and the shift counter circuits 85 are identical to those shown in FIG. 17. The cue signal shown in FIG. 21A is delayed by the delay circuit 91. These signals are AND gated at the AND gate circuits 87–1 to 87–4 and 87–13 to 87–16 together with the outputs of shift counter circuits 85–1 to 85–4 and 85–13 to 85–16. A coincidence of these signals excite memory circuits 100 to provide the wave forms shown in FIG. 21L to 21P and 21R to 21U. FIG. 21B shows the wave form of control signal pulses. The outputs of memory circuits 100 are passed through AND gates 101 and 102, respectively. A start signal output and a finish signal output are shown in FIGS. 21Q and 21V, respectively. These signals are provided through terminals 103 and 104, respectively.

There is no danger of erroneous detection due to noises or other factors because the start and finish signals are each obtained from four pulses. The start and finish signals have an identical pulse arrangement that has nothing to do with the direction of movement of the tape. The output of the direction detection switch 88 need not be used because the finish signal used during recording is the start signal during rewinding. This is also the case with the start signal used during recording. The finish signal mentioned above is used for automatic operation control of the video tape recorder to be described.

Figure 22:
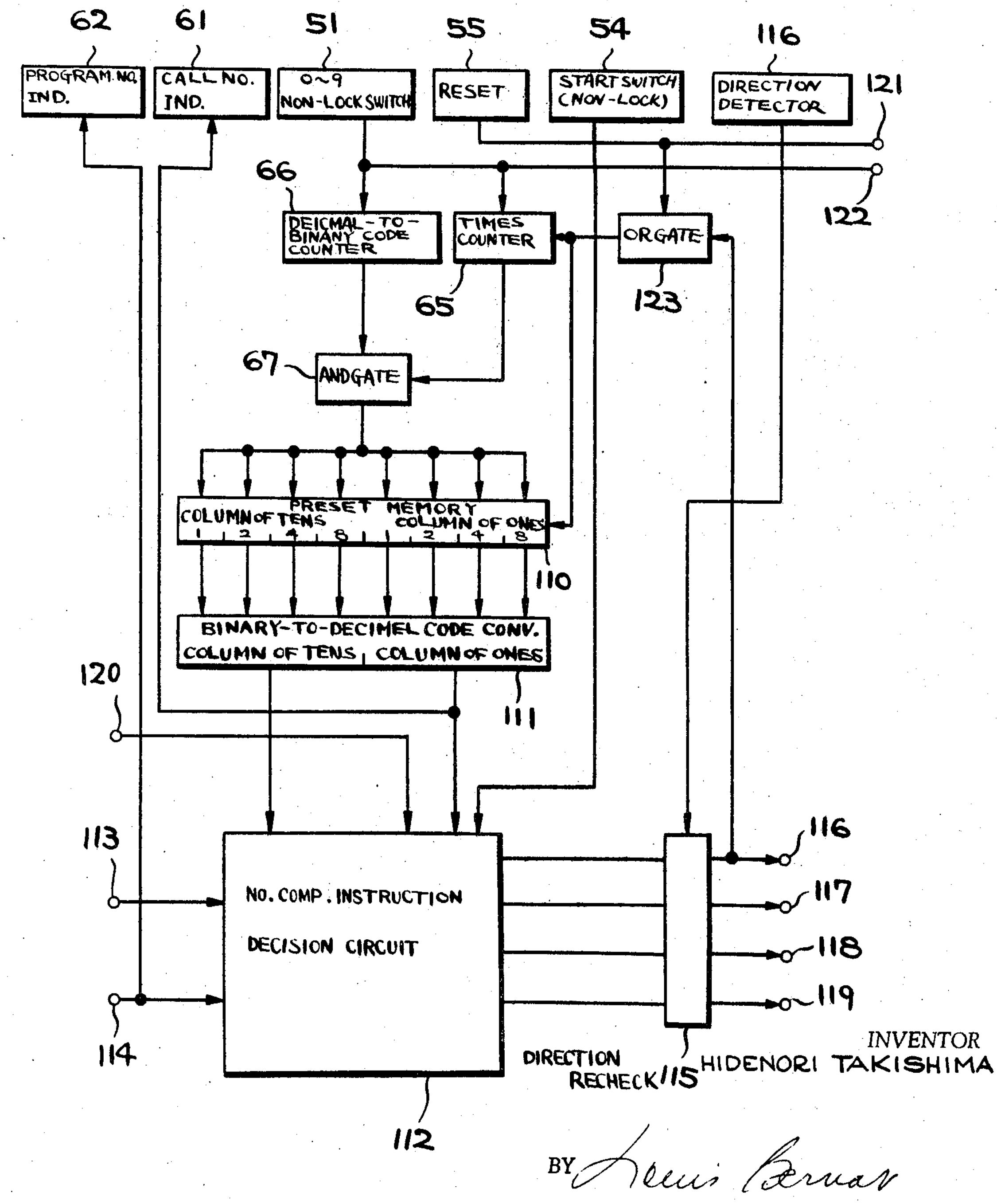
FIG. 22 is a block diagram of one embodiment of the system according to this invention used for automatic operation of a video tape recorder.

Next to be described is an embodiment of the system, according to this invention used for automatic operation of a video tape recorder, as shown in FIG. 22. First, the numbers for the identified cue signals are decided and recorded on a tape. These cue signals identify the contents of picture signals recorded on the tape. The numbers are arranged successively, starting at the leading end of the tape.

When the tape with the recorded signals is reproduced, the read switch button 57 is pushed on the operation panel 50 (FIG. 12) to designate any number of programs, as desired, by operating buttons 0 to 9 of key set 51. This operation is identical with the operation for recording cue signals.

The pulses are stored in separate memory circuits through similar channels. The designated number is indicated in the call number indication zone 61. Designation of the call number may be effected either manually or automatically in association with some other devices.

After the desired call number is designated, the start switch 54 is pushed. This causes the tape to move to the position of the designated number by fast winding or rewinding. The tape will automatically stop in the indicated position if the automatic stop switch 59 is pushed beforehand. If the automatic play switch 58 is pushed beforehand, the tape will start playback automatically after temporarily stopping in the indicated position..

The output of AND gate 67 is supplied to a number comparison instruction decision circuit 112 through a call number preset memory circuits 110 and a binary-to-decimal code conversion circuits 111. Simultaneously, a cue signal consisting of the digits in the column of tens and the column of ones is introduced through terminals 113 and 114, respectively. The call and cue signals are supplied to the circuit 112 for comparison.

Then, upon detection of a comparison, the circuit 112 issues instructions based on the start signal received from the start switch 54. These instructions are (1) a "fast winding" signal is provided when the call number is larger than the program number; (2) a "rewinding" signal is provided when the call number is smaller than the program number; and (3) a "stop" signal is provided if the call number agrees with the program number. It should be noted that these instruction signals are supplied to the video tape recorder through terminals 116 to 119 as a stop signal, fast winding signal, rewinding signal, and playback signal. A direction recheck circuit 115 indicates when the tape has begun to move in the direction as instructed by a direction detector 116.

Also, the system is constructed so that, upon receiving a "finish" signal through a terminal 120, (1) a "fast winding" signal is provided when the call number is greater than the program signal; (2) a "rewinding" signal is provided when the call number is smaller than the program signal; and (3) a "stop" signal is provided when the call number agrees with the program number. Thus, automatic correction is provided to prevent overshoot of the tape due to inertia and other factors.

For example, if a call number 96 is designated by pushing the start switch 54 while the tape is moving to or stopping in the position of program number 79, the video tape recorder will be brought into a fast winding state. Cue numbers are detected starting from 80 and continuing successively through 81, 82, 83 ... until the 96 is reached. When the "finish" signal is detected, a "stop" signal is supplied to the video tape recorder. Then, the supply of instructions is stopped when the direction detector 116 detects that the tape has stopped moving. If the cue number 97 is detected from one cause or another, a "rewinding" signal is provided upon the detection of a "finish" signal. A stop signal is provided when the cue signal 96 is detected.

When the automatic play switch 58 is pushed beforehand, a playback signal is provided after a certain time has elapsed following the appearance of a stop signal. A part of the stop signal resets the call number stored in the memory circuits 110 and cancels the number indicated in the call number indication zone.

It should be noted that a "finish" signal is used. If a comparison of numbers is effected in the number comparison circuit 112 while the cue signal is being detected, a mistaken result may be obtained. For example, the process of indicating the numbers 10, 30, 70, 71 and 79 must occur while 79 is being detected. Therefore, a comparison of numbers must be effected after the correct number has been detected. Terminals 121 and 122 are input terminals for receiving instruction signals from other apparatus. The OR gate 123 is means for forming reset pulses.

While the invention has been shown and described with reference to preferred embodiments thereof, it is to be understood that the invention is not limited to the specific forms of the embodiments.

I claim:

1. A cue signal system for magnetic recording and reproducing apparatus in which a plurality of program picture signals are recorded by rotating magnetic heads on parallel oblique tracks of a magnetic medium and control signal pulses are recorded on a longitudinal control track along an edge of the magnetic medium, said control signal pulses enabling the magnetic medium to travel at the same rate in playback as in recording, said system comprising means for coding a decimal number corresponding to one of the program picture signals, code converter means for converting the outputs of the coding means into binary coded signals, presettable memory circuit means for storing the binary coded signals, manually actuated switch means for generating a pulse signal when the rotating heads begin to scan the parallel oblique tracks on which said one program picture signal is recorded, first AND gate circuit means for AND gating the control signal pulses together with the pulse signal from the manually actuated switch means, shift counter circuit means for shift counting the control signal pulses responsive to the output signal of the first AND gate circuit means, second AND gate circuit means for AND gating the outputs of the preset memory circuit means together with the outputs of the shift counter circuit means, OR gate circuit means for OR gating the outputs of the second AND gate circuit means, delay means for delaying in time the control signal pulses, third AND gate circuit means for AND gating the outputs of the OR gate circuit means together with the output pulses of the delay means, flip-flop circuit means for generating a cue signal responsive to the output signal of the third AND gate circuit means, means for recording the cue signal on a cue signal track of the magnetic medium parallel to the control track, and means for detecting said cue signal.

2. The cue signal system as defined in claim 1 wherein said cue signal detecting means comprises means including the head which records said cue signal for reproducing said cue signal from said magnetic medium, fourth AND gate circuit means for AND gating the reproduced cue signal together with control signal pulses reproduced from the control track, second delay means for delaying in time the outputs of the fourth AND gate circuit means, second shift counter circuit means for shift counting said reproduced control signal pulses, fifth AND gate circuit means for AND gating the output of the second delay means together with the outputs of the second shift counter circuit means, memory circuit means for storing the output signals of the fifth AND gate circuit means, second code converter means for converting the outputs of the memory circuit means into decimal codes, and visible indicator means for indicating numbers corresponding to the decimal codes.

3. The cue signal system as defined in claim 1 wherein said shift counter circuit means includes series connected shift counter circuits.

4. The cue signal system as defined in claim 3 wherein said OR gate circuit means further OR gates outputs of predetermined numbers of stages from the first and from the last in said series connected shift counter circuits, wherein said third AND gate circuit means further AND gates the outputs of the OR gate circuit means corresponding to said predetermined numbers of stages together with the output pulses of the delay circuit means, and wherein said flip-flop circuit means generates end signals responsive to the outputs of the third AND gate circuit means corresponding to said predetermined numbers of stage signals which are disposed at the opposite ends of said cue signal, said end signals comprising start and finish signals each being composed of a set of binary codes.

5. The cue signal system as defined in claim 4 wherein said cue signal detecting means comprises means for reproducing said cue signal from said magnetic medium, fourth AND gate circuit means for AND gating the reproduced cue signal together with the reproduced control signal pulses from the control track, second delay means for delaying in time the outputs of the fourth AND gate circuit means, second shift counter circuit means for shift counting said reproduced control signal pulses, fifth AND gate circuit means for AND gating the outputs of the second delay means together with the outputs of the second shift counter circuit means, first memory circuit means for storing the output signals of the fifth AND gate circuit means which output signals correspond to said start and finish signals, sixth AND gate circuit means for AND gating the outputs of the first memory circuit means corresponding to said start signal and corresponding to said finish signal respectively, second memory circuit means for storing the remaining output signals of the fifth AND gate circuit means, second converter means for converting said remaining outputs of the second memory circuit means into decimal codes, and visible indicator means for indicating numbers corresponding to the decimal codes.

6. The cue signal system as defined in claim 5 which further comprises means responsive to the direction of the movement of said magnetic medium for selecting the order in which said outputs of said second shift counter means are supplied to said fifth AND gate circuit means.